United States Patent
Mukherjee et al.

(10) Patent No.: US 12,028,345 B2
(45) Date of Patent: Jul. 2, 2024

(54) INFORMATION SECURITY SYSTEM AND METHOD FOR IDENTIFYING TRUSTED MACHINES FOR MACHINE-TO-MACHINE (M2M) SECURITY AND VALIDATION

(71) Applicant: Bank of America Corporation, Charlotte, NC (US)

(72) Inventors: Maharaj Mukherjee, Poughkeepsie, NY (US); George Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 369 days.

(21) Appl. No.: 17/324,240

(22) Filed: May 19, 2021

(65) Prior Publication Data

US 2022/0377078 A1 Nov. 24, 2022

(51) Int. Cl.
*H04L 9/40* (2022.01)

(52) U.S. Cl.
CPC .......... *H04L 63/101* (2013.01); *H04L 63/126* (2013.01)

(58) Field of Classification Search
CPC ............................ H04L 63/101; H04L 63/126
See application file for complete search history.

(56) References Cited

U.S. PATENT DOCUMENTS

| | | | |
|---|---|---|---|
| 9,060,719 B2 | 6/2015 | Hayter et al. | |
| 9,213,537 B2 | 12/2015 | Bandakka et al. | |
| 9,317,282 B2 | 4/2016 | Mun et al. | |
| 9,331,856 B1 | 5/2016 | Song | |
| 9,332,307 B2 | 5/2016 | Ramaswamy et al. | |
| 9,378,206 B2 | 6/2016 | Snyder et al. | |
| 9,386,029 B2 | 7/2016 | Pham et al. | |
| 9,390,260 B2 | 7/2016 | Tan et al. | |
| 9,489,533 B2 | 11/2016 | Grube et al. | |
| 9,544,285 B2 | 1/2017 | He et al. | |
| 9,578,017 B2 | 2/2017 | Ferguson et al. | |
| 9,584,517 B1 | 2/2017 | Roth et al. | |
| 9,687,259 B2 | 6/2017 | Pavlovskaia et al. | |
| 9,691,266 B2 | 6/2017 | Deluliis et al. | |
| 9,693,311 B2 | 6/2017 | Cardozo et al. | |
| 9,723,274 B2 | 8/2017 | Lavoie | |
| 9,740,889 B2 | 8/2017 | Li et al. | |
| 9,899,836 B2 | 2/2018 | Forbes, Jr. | |

(Continued)

OTHER PUBLICATIONS

Mukherjee, M. et al., "Information Security System and Method for Machine-To-Machine (M2M) Security and Validation," U.S. Appl. No. 17/324,165, filed May 19, 2021, 39 pages.

*Primary Examiner* — Harris C Wang

(57) ABSTRACT

A system for identifying trusted machines for Machine-to-Machine (M2M) validation receives a query message from a first trusted computing device, requesting whether an unrecognized computing device is in a list of trusted devices associated with a second trusted computing device. The system determines whether the unrecognized computing device is in the list of trusted devices by determining whether an identification associated with the unrecognized computing device is among the list of trusted devices. In response to determining that the unrecognized computing device is in the list of trusted devices, the system sends a response message to the first trusted computing device, indicating that the unrecognized computing device is in the list of trusted devices.

20 Claims, 4 Drawing Sheets

(56) References Cited

U.S. PATENT DOCUMENTS

| | | |
|---|---|---|
| 9,922,725 B2 | 3/2018 | Querbach et al. |
| 9,928,475 B2 | 3/2018 | Burnett |
| 9,942,250 B2 | 4/2018 | Stiansen et al. |
| 10,019,594 B2 | 7/2018 | Zhu et al. |
| 10,079,878 B2 | 9/2018 | Ulrich et al. |
| 10,148,714 B2 | 12/2018 | Wang |
| 10,210,388 B2 | 2/2019 | Derakhshani et al. |
| 10,270,788 B2 | 4/2019 | Faigon et al. |
| 10,317,771 B2 | 6/2019 | Kim et al. |
| 10,387,250 B2 | 8/2019 | Resch et al. |
| 10,416,238 B2 | 9/2019 | Nortman et al. |
| 10,610,378 B2 | 4/2020 | Piron et al. |
| 10,643,604 B2 | 5/2020 | Tapuhi et al. |
| 10,740,804 B2 | 8/2020 | Spivack et al. |
| 10,877,727 B2 | 12/2020 | Vaquero Avils-Casco et al. |
| 10,915,114 B2 | 2/2021 | Ebrahimi Afrouzi et al. |
| 10,929,266 B1 | 2/2021 | Goradia et al. |
| 2012/0198520 A1* | 8/2012 | Cha .................. H04L 63/20 726/2 |
| 2016/0212695 A1* | 7/2016 | Lynch .............. H04W 28/0268 |
| 2017/0098162 A1 | 4/2017 | Ellenbogen et al. |
| 2017/0132497 A1 | 5/2017 | Santos et al. |
| 2017/0256128 A1 | 9/2017 | Saunders et al. |
| 2017/0346901 A1 | 11/2017 | Vas et al. |
| 2018/0082288 A1* | 3/2018 | Chester ............. G06Q 20/3821 |
| 2018/0114591 A1 | 4/2018 | Pribanic et al. |
| 2018/0232693 A1 | 8/2018 | Gillen et al. |
| 2018/0322022 A1 | 11/2018 | Garlapati et al. |
| 2019/0028280 A1 | 1/2019 | Zinder |
| 2019/0058592 A1 | 2/2019 | Wright et al. |
| 2019/0065174 A1 | 2/2019 | Hilliar et al. |
| 2019/0114599 A1 | 4/2019 | Barrett et al. |
| 2019/0174097 A1 | 6/2019 | Downey et al. |
| 2019/0182846 A1* | 6/2019 | Chung ................ H04W 72/542 |
| 2019/0289069 A1 | 9/2019 | Cano Zapata .......... H04W 4/06 |
| 2019/0364049 A1* | 11/2019 | Boss ..................... G06F 21/45 |
| 2020/0153833 A1* | 5/2020 | Rosenblum ........... H04W 48/02 |
| 2020/0220747 A1 | 7/2020 | Butler et al. |
| 2020/0358733 A1 | 11/2020 | Sachtjen |
| 2020/0412791 A1 | 12/2020 | Gero et al. |
| 2022/0377067 A1* | 11/2022 | Mukherjee ........... H04W 12/33 |

* cited by examiner

INFORMATION SECURITY SYSTEM AND METHOD FOR IDENTIFYING TRUSTED MACHINES FOR MACHINE-TO-MACHINE (M2M) SECURITY AND VALIDATION

TECHNICAL FIELD

The present disclosure relates generally to information security, and more specifically to information security system and method for identifying trusted machines for Machine-to-Machine (M2M) security and validation.

BACKGROUND

Many new applications have begun to emerge with the expanding deployment of cellular network infrastructure. The machine-to-machine (M2M) market is one specific segment that has gained considerable widespread usage. This fast-growing market is predicted to see billions of machines interconnected in a near future. As communications among machines continue to grow by ever-increasing use of the Internet of Things (IoT), so does potential fraudulent and criminal activity via such communications. It is challenging to determine whether a machine is malicious or can be trusted. Current machine validation is done manually by a user and thus is tedious and prone to errors. In addition, the current machine validation process suffers from cyber-attacks by bad actors launching cyber-attacks from various machines. Current Machine-to-Machine (M2M) communication and validation technologies are not configured to provide a reliable and efficient solution for M2M validation.

SUMMARY

Current Machine-to-Machine (M2M) communication and validation technologies are not configured to provide a reliable and efficient solution for M2M validation. This disclosure contemplates systems and methods for M2M validation. In general, M2M communication enables various machines equipped with a wireless communication module to implement various communication services with no or minimal human intervention. A group of machines (i.e., computing devices) that have been verified and authenticated (e.g., initially by a user) form a trusted network of peer machines, in which each machine can communicate with other machines in the trusted network without authentication. Each trusted computing device may store a list of trusted devices comprising identifications associated with trusted computing devices in the trusted network.

However, in some cases, an unrecognized computing device may send a request to establish a communication with a trusted machine from the trusted network. This disclosure contemplates verifying whether the unrecognized computing device can be trusted to establish a communication with the trusted machine. For example, the disclosed system may verify whether the unrecognized computing device can be trusted to establish a communication with the trusted machine by any of the trusted machines, as described below.

For example, assume that the unrecognized computing device sends a request message to a first trusted computing device to establish a communication with the first trusted computing device. The first trusted computing device sends a query message to a second trusted computing device from the trusted network, where the query message requests whether the unrecognized computing device is in a list of trusted devices associated with the second trusted computing device. The second trusted computing device searches its corresponding list of trusted devices for an identification associated with the unrecognized computing device. The identification associated with the unrecognized computing device may include one or more of an Internet Protocol (IP) address, a Media Access Control (MAC) address, International Mobile Subscriber Identity (IMSI), International Mobile Station Equipment Identity (IMEI), and a serial number.

For example, assume that the second trusted computing device finds the identification associated with the unrecognized computing device in its corresponding list of trusted devices. In this case, the second trusted computing device sends a response message to the first trusted computing device indicating that the unrecognized computing device can be trusted. In response, the first trusted computing device may accept the unrecognized computing device's request. Thus, the unrecognized computing device may be able to establish communication with the first trusted computing device.

With respect to a system for implementing M2M validation, in one embodiment, the system comprises an unrecognized computing device, a first trusted computing device, and a second trusted computing device. The second trusted computing device is communicatively coupled with the unrecognized computing device and the first trusted computing device. The second trusted computing device comprises a processor and a memory. The memory is operable to store a first list of trusted computing devices comprising at least a first identification uniquely identifying the first trusted computing device, where the first list of trusted computing devices represents computing devices that belong to a trusted network of trusted computing devices. The processor is operably coupled with the memory. The processor receives, from the unrecognized computing device, a request to establish a first communication with the processor. The processor sends a first query message to the first trusted computing device requesting whether the unrecognized computing device is in a second list of trusted computing devices associated with the first trusted computing device. The processor receives, from the first trusted computing device, a first response message indicating that the unrecognized computing device is in the second list of trusted computing devices. In response to receiving the first response message, the processor approves the request.

With respect to a system for identifying a trusted machine for M2M validation, in one embodiment, the system comprises a first trusted computing device, an unrecognized computing device, and a second trusted computing device. The unrecognized computing device is not recognized by the first trusted computing device. The second trusted computing device is communicatively coupled with the first trusted computing device and the unrecognized computing device. The second trusted computing device comprises a memory and a first processor. The memory is operable to store a first list of trusted computing devices comprising a first identification uniquely identifying the first trusted computing device and a second identification uniquely identifying the unrecognized computing device. The first list of trusted computing devices represents computing devices that belong to a trusted network of trusted computing devices. The first processor is operably coupled with the memory. The processor receives, from the first trusted computing device, a first query message requesting whether the unrecognized computing device is noted in the first list of trusted computing devices, in response to the first trusted computing device receiving a first request from the unrecognized computing device to establish a first communication with the first trusted computing device. The first query message comprises the second identification. The processor determines whether the unrecognized computing device is noted in the first list of trusted computing devices by determining whether the second identification is in the first list of trusted computing devices. In response to determining that the unrecognized computing device is noted in the first list of trusted computing devices, the processor sends a first response message to the first trusted computing device indicating that the unrecognized computing device is noted in the first list of trusted computing devices.

The disclosed systems provide several practical applications and technical advantages which include: 1) technology that implements M2M validation to determine whether an unrecognized computing device is trusted by any of the trusted computing devices in a trusted network by a first trusted computing device querying one or more trusted computing devices determine whether the unrecognized computing device is trusted; 2) technology that, in response to determining that the unrecognized computing device is trusted by a trusted computing device, approves the unrecognized computing device's request to establish a communication with one or more of the trusted computing devices; and 3) technology that, in response to determining that the unrecognized computing device is not trusted by any of the trusted computing devices, denies the unrecognized computing device's request to establish a communication with the trusted computing devices, and blocks future communications coming from the unrecognized computing device.

As such, the disclosed systems may improve M2M communication and validation technologies by querying one or more trusted computing devices in a trusted network to determine whether an unrecognized computing device is trusted by any of the trusted devices. For example, the disclosed system facilitates one-to-one communication among peer trusted computing devices (e.g., from a first trusted computing device to a second trusted computing device) to determine whether the unrecognized computing device is trusted by the second trusted computing device. In another example, the disclosed system facilitates one-to-many communication among peer trusted computing devices, e.g., from the first trusted computing device to multiple trusted computing devices. In cases where the unrecognized computing device is not trusted by the second trusted computing device, the first trusted computing device may query a third trusted computing device to determine whether the unrecognized computing device is trusted by the third computing device. In another example, the disclosed system facilitates many-to-many communication among peer trusted computing devices, e.g., from the first trusted computing device to the second trusted computing device, and from the second trusted computing device to the third trusted computing device, and so on. For example, in cases where the unrecognized computing device is not trusted by the second trusted computing device, the second trusted computing device may query the third trusted computing device to determine whether the unrecognized computing device is trusted by the third trusted computing device.

Accordingly, the disclosed systems may be integrated into a practical application of improving communications among various machines (e.g., computing devices). This, in turn, provides an additional practical application of improving underlying operations of trusted computing devices. For example, the disclosed system may reduce processing, memory, and time resources for processing incoming requests from unrecognized computing devices that would otherwise be spent using the current M2M communication technologies.

The disclosed systems may further be integrated into an additional practical application of securing data stored in the trusted computing devices from unauthorized access and thus, from data extraction, exfiltration, modification, destruction, etc., via the unrecognized computing devices.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions for Machine-to-Machine (M2M) validation and security. This disclosure provides various systems and methods for M2M validation and security. In one embodiment, system 100 and method 200 for M2M validation and security are described in FIGS. 1 and 2, respectively. In one embodiment, system 300 and method 400 for identifying a trusted machine for M2M validation and security are described in FIGS. 3 and 4, respectively.

Example System for M2M Validation

Figure 1:
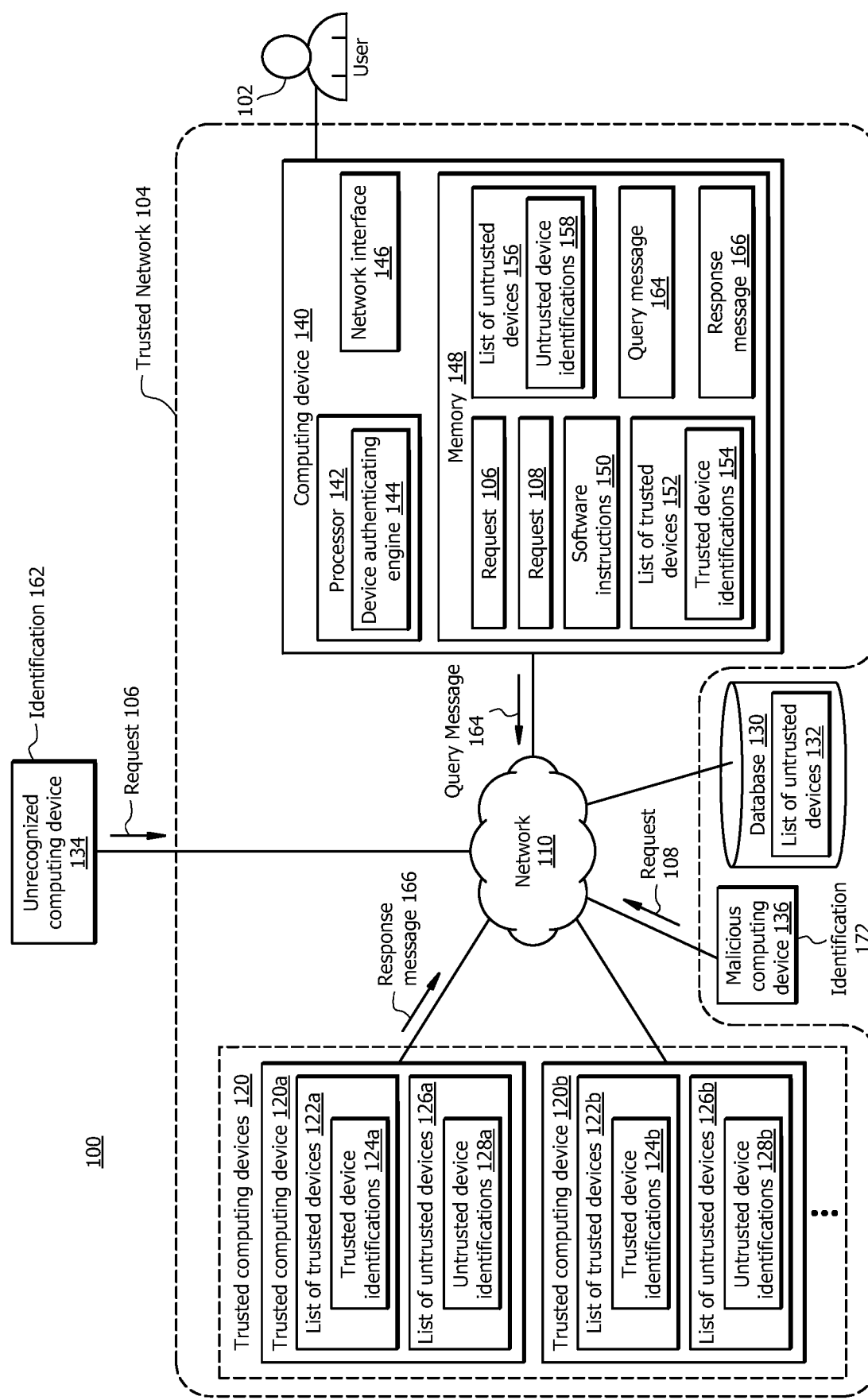
FIG. 1 illustrates an embodiment of a system configured to implement M2M validation.

FIG. 1 illustrates one embodiment of a system 100 that is configured for M2M validation and security. In one embodiment, system 100 comprises a computing device 140, one or more trusted computing devices 120, and an unrecognized computing device 134. In some embodiments, system 100 may further comprise a network 110, a malicious computing device 136, and a database 130. Network 110 enables communications between components of system 100. Computing device 140 comprises a processor 142 in signal communication with a memory 148. Memory 148 stores software instructions 150 that when executed by the processor 142 cause the processor 142 to perform one or more functions described herein. For example, when the software instructions 150 are executed, the processor 142 executes a device authenticating engine 144 to determine whether an unrecognized computing device 134 is trusted to be granted a request to establish a communication with the computing device 140. In other embodiments, system 100 may not have all of the components listed and/or may have other elements instead of, or in addition to, those listed above.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Each of the trusted computing devices 120 is generally any device that is configured to process data and interact with users. Examples of a trusted computing device 120 include, but are not limited to, a personal computer, a desktop computer, a workstation, a server, a laptop, a tablet computer, a mobile phone (such as a smartphone), a smartwatch, an Automated Teller Machine (ATM), and a card reader, etc. Each of the trusted computing devices 120 may include a user interface, such as a display, a microphone, keypad, or other appropriate terminal equipment usable by a user. Each of the trusted computing devices 120 may include a hardware processor, memory, and/or circuitry configured to perform any of the functions or actions of the trusted computing device 120 described herein. For example, a software application designed using software code may be stored in the memory and executed by the processor to perform the functions of the trusted computing device 120.

The trusted computing devices 120 and the computing device 140 belong to the trusted network 104. The trusted network 104 is generally a mesh or group of devices that have previously been verified or authenticated, e.g., through a verification process, as described below. With respect to computing device 140 and the trusted computing device 120*a*, the device authenticating engine 144 may determine that the trusted computing device 120*a* is trusted based on verifying that the trusted computing device 120*a* is presently (and/or previously was) connected to the same communication network account (e.g., WIFI user account or any other communication protocols) as the computing device 140. For example, the device authenticating engine 144 may determine that the trusted computing device 120*a* is trusted based on determining that the user 102 has used the same login credentials for connecting to the same communication network account on the trusted computing device 120*a* and the computing device 140. In another example, the device authenticating engine 144 may determine that the trusted computing device 120*a* is trusted based on determining that the trusted computing device 120*a* is connected to the same network 110 (e.g., wirelessly or via wires connected to the same modem, router, switch, etc.) as the computing device 140. In another example, the device authenticating engine 144 may determine that the trusted computing device 120*a* is trusted based on determining that the trusted computing device 120*a* is within a threshold distance from the computing device 140 and connected to the same network 110 and/or same communication network account.

The trusted computing devices 120 may include a first trusted computing device 120*a*, a second trusted computing device 120*b*, and so on. Each of the trusted computing devices 120 may store a list of trusted devices 122 and a list of untrusted devices 126.

Each of the trusted computing device 120 may store trusted device identifications 124 in its corresponding list of trusted devices 122, where the trusted device identifications 124 are associated with trusted devices 120 and computing device 140 that have been authenticated by that trusted computing device 120. The trusted device identifications 124 may include an Internet Protocol (IP) address, a Media Access Control (MAC) address, International Mobile Subscriber Identity (IMSI), International Mobile Station Equipment Identity (IMEI), or a serial number associated with a corresponding trusted devices 120, 140.

For example, the first trusted computing device 122*a* may store a list of trusted devices 122*a* and a list of untrusted devices 126*a*. The list of trusted devices 122*a* comprises trusted device identifications 124*a* associated with trusted devices 120 and the computing device 140 that previously have been paired with or authenticated by the first trusted computing device 120*a*, e.g., by a user. The list of untrusted devices 128*b* comprises untrusted computing device identifications 128*a* associated with malicious computing devices 136 that previously have been identified to be malicious by the first trusted computing device 120*a*.

Similarly, the second trusted computing device 122*b* may store a list of trusted devices 122*b* and a list of untrusted devices 126*b*. The list of trusted devices 122*b* comprises trusted device identifications 124*b* associated with trusted devices 120 and the computing device 140 that previously have been paired with or authenticated by the second trusted computing device 120*b*, e.g., by a user. The list of untrusted devices 126*b* comprises untrusted computing device identifications 128*b* associated with malicious computing devices 136 that previously have been identified to be malicious by the second trusted computing device 122*b*.

Database 130 generally comprises any storage architecture. Examples of database 130 include, but are not limited to, a network-attached storage cloud, a storage area network, a storage assembly directly (or indirectly) coupled to one or more components of the system 100. The database 130 stores a list of untrusted devices 126. The list of untrusted devices 126 may comprise lists of untrusted devices 126 associated with each trusted device 120, including the list of trusted devices 122*a*, 122*b* and the list of trusted devices 152 associated with the computing device 140. For example, each of the trusted devices 120 and the computing device 140 may share their corresponding list of untrusted devices 126, 152 with other computing devices in the trusted network 104, by storing their corresponding list of untrusted devices 126, 152 in the database 130.

Unrecognized computing device 134 is generally any device that is configured to process data and interact with users. Examples of unrecognized computing device 134 include, but are not limited to, a personal computer, a desktop computer, a workstation, a server, a laptop, a tablet computer, a mobile phone (such as a smartphone), a smartwatch, an ATM, and a card reader, etc. The unrecognized computing device 134 may include a user interface, such as a display, a microphone, keypad, or other appropriate terminal equipment usable by a user. The unrecognized computing device 134 may include a hardware processor, memory, and/or circuitry configured to perform any of the functions or actions of the unrecognized computing device 134 described herein. For example, a software application designed using software code may be stored in the memory and executed by the processor to perform the functions of the unrecognized computing device 134. The unrecognized computing device 134 may send a request 106 to the computing device 140 to establish a communication with the computing device 140. The computing device 140, via the processor 142, determines whether the unrecognized computing device 134 is trusted by any of the trusted computing devices 120. This process is described in detail further below.

Malicious computing device 136 is generally any device that is configured to process data and interact with users. Examples of malicious computing device 136 include, but are not limited to, a personal computer, a desktop computer, a workstation, a server, a laptop, a tablet computer, a mobile phone (such as a smartphone), a smartwatch, an ATM, and a card reader, etc. The malicious computing device 136 may include a user interface, such as a display, a microphone, a keypad, or other appropriate terminal equipment usable by a user. Malicious computing device 136 may include a hardware processor, memory, and/or circuitry configured to perform any of the functions or actions of the malicious computing device 136 described herein. For example, a software application designed using software code may be stored in the memory and executed by the processor to perform the functions of the malicious computing device 136.

A trusted device 120 may determine that the malicious computing device 136 cannot be trusted, for example, based on detecting multiple communication attempts more than a threshold number of attempts (e.g., more than ten, fifteen, etc. communication attempts) in a short period of time less than a threshold duration (e.g., less than three minutes, five minutes, etc.). The malicious computing device 136 may send a request 108 to the computing device 140 to establish a communication with the computing device 140. The computing device 140, via the processor 142, determines whether the malicious computing device 136 is trusted by any of the trusted devices 120. This process is described in more detail further below.

Computing Device

Computing device 140 is generally any device that is configured to process data and interact with users. Examples of computing device 140 include, but are not limited to, a personal computer, a desktop computer, a workstation, a server, a laptop, a tablet computer, a mobile phone (such as a smartphone), a smartwatch, an ATM, a card reader, etc. The computing device is configured to communicate with other computing devices (e.g., trusted computing devices 120, unrecognized computing device 134, and malicious computing device 136), databases (e.g., database 130), etc. via the network 110. The computing device 140 is generally configured to oversee operations of the device authenticating engine 144, as described further below in conjunction with the operational flow of system 100 and method 200 described in FIG. 2. The computing device 140 may be an instance of a trusted computing device 120.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the device authenticating engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-2. For example, the processor 142 may be configured to perform one or more steps of method 200 as described in FIG. 2.

Network interface 146 is configured to enable wired and/or wireless communications (e.g., via network 110). The network interface 146 is configured to communicate data between the computing device 140 and other devices (e.g., computing devices 120, 134, 136), databases (e.g., database 130), systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the requests 106, 108, software instructions 150, list of trusted devices 152, list of untrusted devices 156, query message 164, response messages 166, and/or any other data or instructions. The software instructions 150 may comprise any suitable set of instructions, logic, rules, or code operable to execute the processor 142.

Device Authenticating Engine

Device authenticating engine 144 may be implemented by the processor 142 executing software instructions 150, and is generally configured to determine whether a device that does not belong to the trusted network 104 (e.g., the unrecognized computing device 134 and/or malicious computing device 136) and is trusted by any of the trusted computing devices 120. In one embodiment, the device authenticating engine 144 may be implemented by an event-triggering algorithm that is executed by the processor 142 when a request (e.g., request 106 and/or request 108) for establishing communication from a device that does not belong to the trusted network 104 is received. Once the device authenticating engine 144 receives the request, the device authenticating engine 144 determines whether a computing device that initiated the request is trusted by any of the trusted computing devices 120, 140. The corresponding description below described the operational flow of system 100.

Operational Flow

Determining Whether an Unrecognized Computing Device is Trusted

The operational flow of system 100 begins when the device authenticating engine 144 receives the request 106 from the unrecognized computing device 134 to establish a communication with the computing device 140 (and thus, the processor 142). Upon receiving the request 106, the device authenticating engine 144 determines that the unrecognized computing device 134 is not among the list of trusted devices 152 based on determining that an identification 162 associated with the unrecognized computing device 134 is not among the trusted device identifications 154. The identification 162 may include an IP address, a MAC address, an IMSI, an IMEI, or a serial number associated with the unrecognized computing device 134.

The device authenticating engine 144 executes the software instructions 150 to determine whether the unrecognized computing device 134 is trusted by any of the trusted devices 120. In this process, the device authenticating engine 144 sends a query message 164 to one or more of the trusted devices 120, where the query message 164 requests whether the unrecognized computing device 134 is trusted. The query message 164 may include the identification 162.

For example, assume that the device authenticating engine 144 sends the query message 164 to the trusted computing device 120*a*, where the query message 164 requests whether the unrecognized computing device 134 is in the list of trusted devices 122*a*. In response to receiving the query message 164, the trusted device 120*a*, via its processor, determines whether the unrecognized computing device 134 is in the list of trusted devices 122*a* by searching for the identification 162 in the trusted device identifications 124*a*. The trusted device 120*a*, via its processor, may execute a parsing or searching algorithm to look for the identification 162 among the trusted device identifications 124*a*.

For example, assume that the trusted device 120*a* finds the identification 162 among the trusted device identifications 124*a*. Thus, the trusted device 120*a* determines that the unrecognized computing device 134 is among the list of trusted devices 122*a*. In response, the trusted computing device 120*a* sends a response message 166 to the computing device 140, where the response message 166 indicates that the unrecognized computing device 134 is among the list of trusted devices 122*a*. Upon receiving the response message 166, the device authenticating engine 144 approves the request 106. Further, upon receiving the response message 166, the device authenticating engine 144 may add the unrecognized computing devices 134 to the list of trusted devices 152 by storing the identification 162 in the trusted device identifications 154.

In another example, assume that the trusted device 120*a* does not find the identification 162 in the trusted device identifications 124*a*. In this case, the trusted device 120*a*, via its processor, may send a second response message 166 to the computing device 140, where the second response message 166 indicates that the unrecognized computing device 134 is not among the list of trusted devices 122*a*.

In one embodiment, assuming that the trusted network 104 only consists of the computing device 140 and the trusted computing device 120*a*, upon receiving the second response message 166, the device authenticating engine 144 denies the request 106.

In another embodiment, assuming that there is at least one more trusted device 120 in the trusted network 104, upon receiving the second response message 166, the device authenticating engine 144 may send the query message 164 to another trusted computing device 120 (e.g., trusted device 120*b*). If at least one trusted device 120 finds the identification 162 in its corresponding list of trusted devices 122, the at least one trusted device 120 may send a response message to the computing device 140 indicating that the unrecognized computing device 134 can be trusted, i.e., is in its corresponding list of trusted devices 122. Assuming that none of the trusted devices 120 determine that the unrecognized computing device 134 is among their respective list of trusted devices 122, the device authenticating engine 144 denies the request 106.

In response to receiving the second query message 164, the device authenticating engine 144 may add the unrecognized computing device 134 to the list of untrusted devices 156 by storing the identification 162 in the untrusted device identifications 158. The device authenticating engine 144 may further implement a firewall configuration that indicates communications and requests 106 from the unrecognized computing device 134 should be blocked. For example, the device authenticating engine 144 may register the identification 172 in a Domain Name System (DNS) server communicatively coupled with the trusted computing devices 120 and computing device 140 to block communications and requests 106 to trusted computing devices 120 and computing device 140.

In one embodiment, the device authenticating engine 144 may send the query message 164 to each of the trusted devices 120 one by one, as described above. In another embodiment, the device authenticating engine 144 may send the query message 164 to the trusted devices 120 (or different subsets of trusted devices 120) simultaneously. The device authenticating engine 144 may query each trusted device 120 until the device authenticating engine 144 determines whether the unrecognized computing device 134 is trusted or not by any of the trusted devices 120.

In one embodiment, upon determining that the unrecognized computing device 134 is not among the list of trusted devices 122*a*, the first trusted computing device 120*a* (and/or the computing device 140) may send one or more query messages to one or more trusted computing devices 120 to determine whether the unrecognized computing device 134 is trusted by any of the trusted computing devices 120. Assuming that a trusted computing device 120 determines that the unrecognized computing device 134 is among its list of trusted devices 122, that trusted computing device 120 sends a response message to the computing device 140 indicating that the unrecognized computing device 134 is among its list of trusted devices 122, and thus can be trusted. If none of the trusted computing devices 120 find the unrecognized computing device 134 in their list of trusted devices 122, they may send response messages to the computing device 140 indicating that the unrecognized computing device 134 is not among its list of trusted devices 122, and thus can be trusted.

Determining Whether a Malicious Computing Device is Trusted

Similar to that described above, the device authenticating engine 144 may determine whether the malicious computing device 136 is trusted by any of the trusted computing devices 120. For example, assume that the device authenticating engine 144 receives a request 108 from the malicious computing device 136 to establish a communication with the computing device 140 (and thus, the processor 142). The device authenticating engine 144 determines that the malicious computing device 136 is not among the list of trusted devices 152 based on determining that the identification 172 is not among the trusted device identifications 154. The identification 172 may include an IP address, a MAC address, an IMSI, an IMEI, or a serial number associated with the malicious computing device 136.

In one embodiment, upon receiving the request 108, the device authenticating engine 144 may determine whether the malicious computing device 136 is trusted or not by looking for the identification 172 in the list of untrusted devices 126 stored in the database 130. If the device authenticating engine 144 finds the identification 172 in the list of untrusted devices 126, the device authenticating engine 144 denies the request 108. In another embodiment, upon receiving the request 108, the device authenticating engine 144 may determine whether the malicious computing device 136 is trusted or not by querying one or more trusted devices 120, similar to that described above with respect to determining whether the unrecognized computing device 134 is trusted by any of the trusted computing devices 120.

In one embodiment, the device authenticating engine 144 may be configured to implement a virtual security boundary around the computing device 140, such that the device authenticating engine 144 is configured to block incoming communications from unrecognized computing devices 134 and/or malicious computing devices 136 within the virtual security boundary. The user 102 may activate the virtual security boundary, e.g., in crowded areas, and deactivate the virtual security boundary in other places as user 102 wishes. Thus, while the virtual security boundary is active, the computing device 140 may receive communications from trusted devices 120.

In one embodiment, each of the list of trusted devices 122 and the list of untrusted devices 126 may be configurable from any of the trusted devices 120 and/or the computing device 140. For example, the user 102 may add and/or remove devices in the list of trusted devices 122a and/or list of untrusted devices 126a by interacting with a software, mobile, and/or web application resident in the computing device 140 that is configured to display the list of trusted devices 122a and list of untrusted devices 126a on a display screen of the computing device 140. Similarly, the user 102 may add and/or remove devices in the list of trusted devices 122b and/or the list of untrusted devices 126b by interacting with the software, mobile, and/or web application resident in the computing device 140 that is configured to display the list of trusted devices 122b and the list of untrusted devices 126b on a display screen of the computing device 140.

Example Method for M2M Validation

Figure 2:
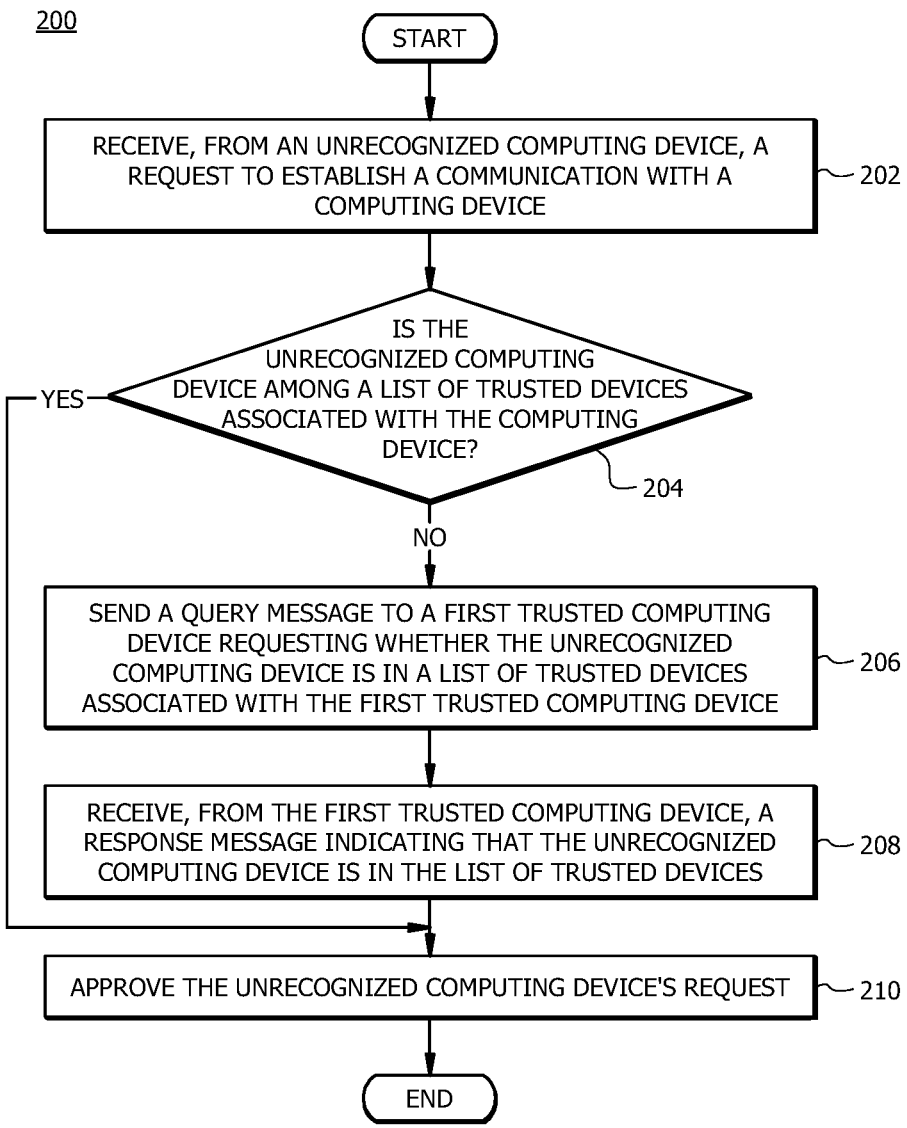
FIG. 2 illustrates an example flowchart of a method for implementing M2M validation.

FIG. 2 illustrates an example flowchart of a method 200 for M2M validation. Modifications, additions, or omissions may be made to method 200. Method 200 may include more, fewer, or other steps. For example, steps may be performed in parallel or in any suitable order. While at times discussed as the system 100, computing device 140, processor 142, device authenticating engine 144, trusted device 120, or components of any of thereof performing steps, any suitable system or components of the system may perform one or more steps of the method 200. For example, one or more steps of method 200 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 202-210.

Method 200 begins at step 202 where the device authenticating engine 144 receives, from an unrecognized computing device 134, a request 106 to establish a communication with the computing device 140. For example, the request 106 may include accessing data stored in memory 148. In another example, the request 106 may include providing data (e.g., a file, document, etc.) to the computing device 140. In another example, the request 106 may include a transaction request 106, e.g., withdraw an amount, deposit and amount, check balance, etc.

At step 204, the device authenticating engine 144 determines whether the unrecognized computing device 134 is among the list of trusted devices 152 associated with the computing device 140. For example, from the request 106, the device authenticating engine 144 may identify an identification 162 associated with the unrecognized computing device 134 from the request 106, and execute a parsing or searching algorithm to search for the identification 162 among the trusted device identifications 154. If the device authenticating engine 144 finds the identification 162 among the trusted device identifications 154, the device authenticating engine 144 determines that the unrecognized computing device 134 is in the list of trusted devices 152. Otherwise, the device authenticating engine 144 determines that the unrecognized computing device 134 is not in the list of trusted devices 152. If the device authenticating engine 144 determines that the unrecognized computing device 134 is among the list of trusted devices 152, method 200 proceeds to step 210. Otherwise, method 200 proceeds to step 206.

At step 206, the device authenticating engine 144 sends a query message 164 to the first trusted computing device 120a requesting whether the unrecognized computing device 134 is in the list of trusted devices 122a associated with the first trusted computing device 120a. For example, assume that in response to receiving the query message 164, the trusted device 120a determines that the unrecognized computing device 134 is in the list of trusted devices 122a, similar to that described in FIG. 1.

At step 208, the device authenticating engine 144 receives, from the first trusted computing device 120a, a response message 166 indicating that the unrecognized computing device 134 is in the list of trusted devices 122a.

At step 210, the device authenticating engine 144 approves the request 106. The device authenticating engine 144 may add the identification 162 to the trusted device identifications 154, i.e., add the unrecognized computing device 134 to the list of trusted devices 152.

In one embodiment, in response to determining that the unrecognized computing device 134 is not in the list of trusted devices 122a, the trusted computing device 120a, via its processor, may send a query message to the second trusted computing device 120b requesting whether the unrecognized computing device 134 is in the list of trusted devices 122b. Similarly, the trusted computing device 120a may send one or more query messages to one or more trusted computing devices 120 requesting whether the unrecognized computing device 134 is in their corresponding list of trusted devices 122. For example, assuming that the second trusted computing device 120b determines that the unrecognized computing device 134 is in the list of trusted devices 122b, the second trusted computing device 120b may send a response message to the computing device 140 indicating that the unrecognized computing device 134 is in the list of trusted devices 122a and thus, can be trusted.

In one embodiment, assuming that the unrecognized computing device 134 was not found in the list of trusted devices 122a, the trusted computing device 120a may send a response message 166 to the computing device 140 indicating that the unrecognized computing device 134 is not among the list of trusted devices 122a. Thus, the device authenticating engine 144 may send a second query message 164 to the second trusted computing device 120b requesting whether the unrecognized computing device 134 is among the list of trusted devices 126b. Similarly, the device authenticating engine 144 may send one or more query messages to one or more trusted computing devices 120 requesting whether the unrecognized computing device 134 is in their corresponding list of trusted devices 122.

As such, the present disclosure contemplates one-to-one (e.g., computing device 140 to trusted computing device 120a), one-to-many (e.g., computing device 140 to multiple trusted computing devices 120), and many-to-many (e.g., among the computing device 140, trusted device 120a, and trusted device 120b, and/or other trusted devices 120).

Example System for Identifying Trusted Machines for M2M Validation

Figure 3:
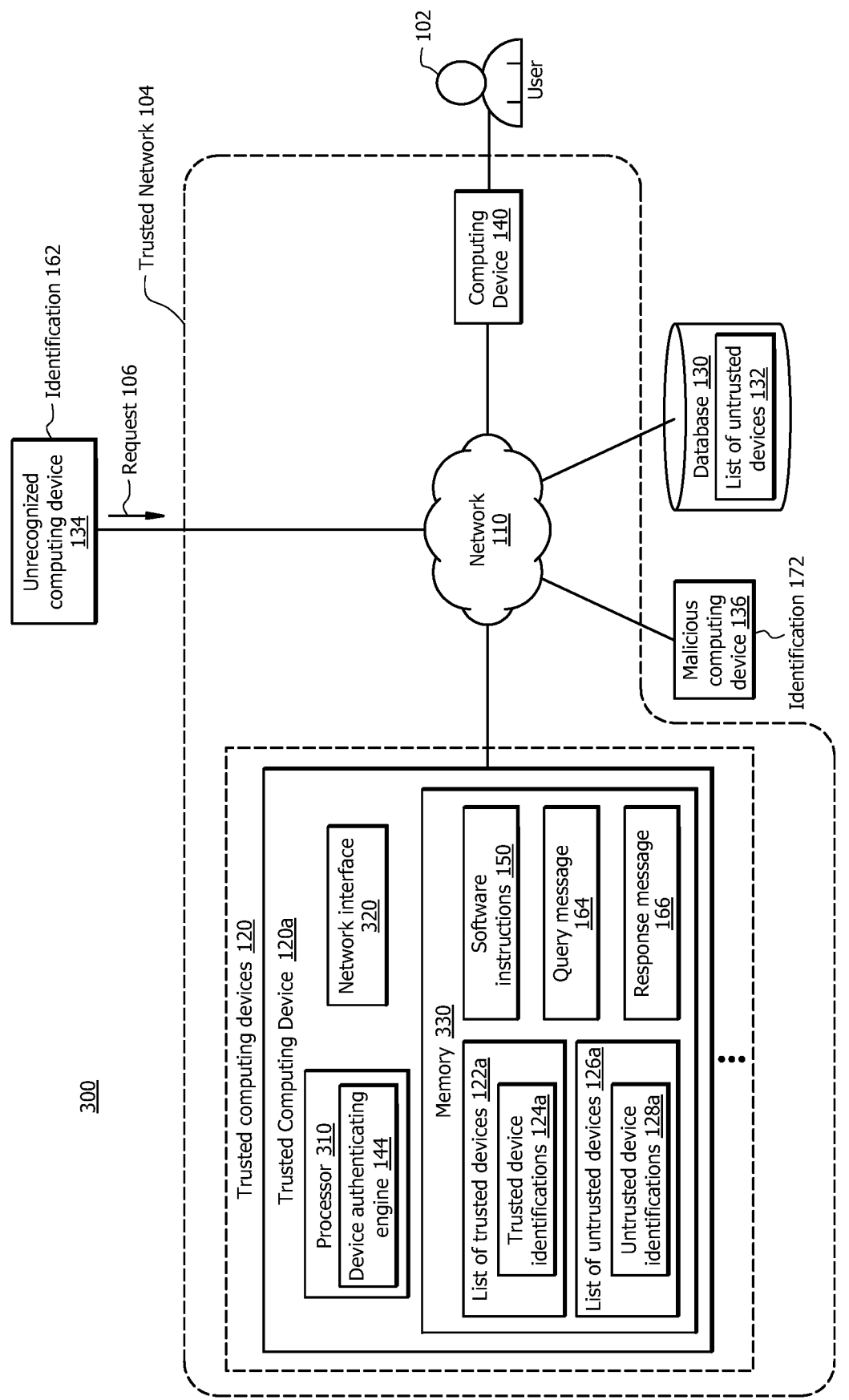
FIG. 3 illustrates an embodiment of a system configured to identify trusted machines for M2M validation.

FIG. 3 illustrates one embodiment of a system 300 configured for identifying trusted machines for M2M validation. In one embodiment, system 300 comprises a trusted computing device 120a. In some embodiments, system 300 further comprises network 110, unrecognized computing device 134, malicious computing device 136, computing device 140, and database 130. Certain components of system 300 are described in FIG. 1. The trusted computing device 120a comprises a processor 310 in signal communication with a memory 330. Memory 330 stores software instructions 150 that when executed by the processor 310 cause the processor 310 to perform one or more functions described herein. For example, when the software instructions 150 are executed, the processor 310 executes the device authenticating engine 144 to determine whether the unrecognized computing device 134 is in the list of trusted devices 122a. In other embodiments, system 300 may not have all of the components listed and/or may have other elements instead of, or in addition to, those listed above.

System Components

In the illustrated embodiment, the trusted computing device 120a comprises the processor 310, network interface 320, and memory 330. The trusted computing device 120a may be shown as configured or in any other configurations.

Processor 310 comprises one or more processors operably coupled to the memory 330. The processor 310 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 310 may be a programmable logic device, a microcontroller, a microprocessor, or any suitable combination of the preceding. The one or more processors are configured to process data and may be implemented in hardware or software. For example, the processor 310 may be 8-bit, 16-bit, 32-bit, 64-bit, or of any other suitable architecture. The processor 310 may include an arithmetic logic unit (ALU) for performing arithmetic and logic operations, processor 310 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the device authenticating engine 144. In this way, processor 310 may be a special-purpose computer designed to implement the functions disclosed herein. In an embodiment, the processor 310 is implemented using logic units, FPGAs, ASICs, DSPs, or any other suitable hardware. The processor 310 is configured to operate as described in FIGS. 3-4. For example, the processor 310 may be configured to perform one or more steps of method 400 as described in FIG. 4.

Network interface 320 is configured to enable wired and/or wireless communications (e.g., via network 110). The network interface 320 is configured to communicate data between the computing device 120a and other devices (e.g., computing devices 140, 134, 136), databases (e.g., database 130), systems, or domains. For example, the network interface 320 may comprise a WIFI interface, a local area network (LAN) interface, a wide area network (WAN) interface, a modem, a switch, or a router. The processor 310 is configured to send and receive data using the network interface 320. The network interface 320 may be configured to use any suitable type of communication protocol as would be appreciated by one of ordinary skill in the art.

Memory 330 may be volatile or non-volatile and may comprise a read-only memory (ROM), random-access memory (RAM), ternary content-addressable memory (TCAM), dynamic random-access memory (DRAM), and static random-access memory (SRAM). Memory 330 may be implemented using one or more disks, tape drives, solid-state drives, and/or the like. Memory 330 is operable to store the software instructions 150, list of trusted devices 122a, list of untrusted devices 126a, query message 164, response messages 166, and/or any other data or instructions. The software instructions 150 may comprise any suitable set of instructions, logic, rules, or code operable to execute the processor 310. The operation of identifying trusted machines for M2M validation is described in method 400 of FIG. 4.

Operational Flow

The operational flow of system 300 begins when the trusted computing device 120a receives a query message 164 from the computing device 140, where the query message 164 requests whether the unrecognized computing device 134 is noted in the list of trusted devices 122a. For example, the trusted computing device 120a may receive the query message 164 in response to the computing device 140 receiving a request 106 from the unrecognized computing device 134 to establish a first communication with the computing device 140, similar to that described in FIGS. 1 and 2. The query message 164 may include the identification 162 associated with the unrecognized computing device 134.

In response to receiving the query message 164, the trusted computing device 120a searches to find the identification 162 in the list of trusted devices 122a, similar to that described in FIG. 1. For example, assume that the device authenticating engine 144 finds the identification 162 in the list of trusted devices 122a. Thus, in this example, the device authenticating engine 144 sends a response message 166 to the computing device 140 indicating that the unrecognized computing device 134 is noted in the list of trusted devices 122a, i.e., the unrecognized computing device 134 can be trusted.

In another example, assume that the device authenticating engine 144 does not find the identification 162 in the list of trusted devices 122a. Thus, in this example, the device authenticating engine 144 sends a second response message 166 to the computing device 140 indicating that the unrecognized computing device 134 is not noted in the list of trusted devices 122a. In this example, assuming that the trusted network 104 only comprises the trusted computing device 120a and the computing device 140, the trusted computing device 120a and/or the computing device 140 may add the identification 162 to the list of untrusted devices 126a and/or 156, respectively.

If the trusted network 104 comprises other trusted computing devices 120, the computing device 140 and/or the trusted computing device 120a may query one or more trusted computing devices 120 to determine whether the unrecognized computing device 134 is trusted by any of the trusted computing devices 120 (i.e., if the unrecognized computing device 134 is in the list of trusted devices 122 associated with any of the trusted computing devices 120).

If the unrecognized computing device 134 is trusted by at least one of the trusted computing devices 120, that trusted computing device 120 sends a response message to the computing device 140 indicating that the unrecognized computing device 134 is in the list of trusted devices 122 associated by that trusted computing device 120.

If none of the trusted computing devices 120 determine that the unrecognized computing device 134 is noted in their corresponding list of trusted devices 122, the computing device 140 and/or the trusted computing devices 120 add the identification 162 in the list of untrusted computing devices 126 and/or 156, respectively, similar to that described in FIGS. 1 and 2.

In one embodiment, the process of determining whether the malicious computing device 136 can be trusted to establish a communication with any of the trusted computing devices 120 and/or the computing device 140 may be similar to that described above with respect to determining whether the unrecognized computing device 134 can be trusted and similar to that described in FIGS. 1 and 2.

Example Method for Identifying Trusted Machines for M2M Validation

Figure 4:
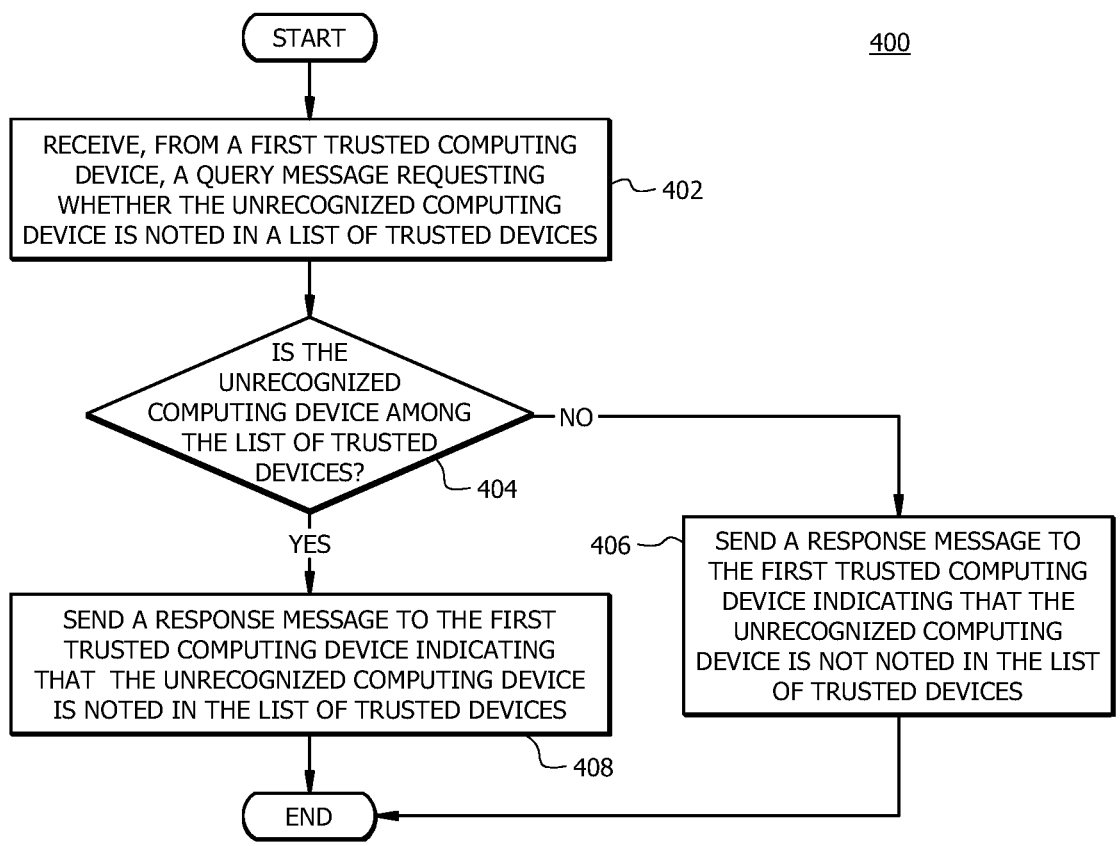
FIG. 4 illustrates an example flowchart of a method for identifying trusted machines for M2M validation.

FIG. 4 illustrates an example flowchart of a method 400 for identifying a trusted machine for M2M validation. Modifications, additions, or omissions may be made to method 400. Method 400 may include more, fewer, or other steps. For example, steps may be performed in parallel or in any suitable order. While at times discussed as the system 300, processor 310, device authenticating engine 144, computing device 140, or components of any of thereof performing steps, any suitable system or components of the system may perform one or more steps of the method 400. For example, one or more steps of method 400 may be implemented, at least in part, in the form of software instructions 150 of FIG. 3, stored on non-transitory, tangible, machine-readable media (e.g., memory 330 of FIG. 3) that when run by one or more processors (e.g., processor 310 of FIG. 3) may cause the one or more processors to perform steps 402-406.

Method 400 begins at step 402 when the device authenticating engine 144 receives, from a first trusted computing device 140, a query message 164 requesting whether the unrecognized computing device 134 is noted in the list of trusted devices 122*a*. For example, the device authenticating engine 144 may receive the query message 164 from the computing device 140, in response to the computing device 140 receiving a request 106 from the unrecognized computing device 134 to establish a first communication with the computing device 140. The query message 164 may include an identification 162 uniquely identifying the unrecognized computing device 134.

At step 404, the device authenticating engine 144 determines whether the unrecognized computing device 134 is noted in the list of trusted devices 122*a* associated with the trusted computing device 120*a*. For example, the device authenticating engine 144 may determine whether the unrecognized computing device 134 is noted in the list of trusted devices 122*a* by determining whether the identification 162 is among the trusted device identifications 124*a*, similar to that described in FIGS. 1 and 2. If the identification 162 is among the trusted device identifications 124*a*, the device authenticating engine 144 determines that the unrecognized computing device 134 is noted in the list of trusted devices 122*a*. Otherwise, the device authenticating engine 144 determines that the unrecognized computing device 134 is not noted in the list of trusted devices 122*a*. In response to determining that the unrecognized computing device 134 is not noted in the list of trusted devices 122*a*, method 400 proceeds to step 406. Otherwise, method 400 proceeds to step 408.

At step 406, the device authenticating engine 144 sends a response message 166 to the first trusted computing device 140 indicating that the unrecognized computing device 134 is not noted in the list of trusted devices 122*a*. In response to receiving the response message 166, the computing device 140 may accept the request 106, similar to that described in FIGS. 1 and 2.

At step 408, the device authenticating engine 144 sends a response message 166 to the first trusted computing device 140 indicating that the unrecognized computing device 134 is noted in the list of trusted devices 122*a*. In response to receiving the response message 166, the computing device 140 may deny the request 106, similar to that described in FIGS. 1 and 2.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for identifying a trusted machine for Machine-to-Machine (M2M) validation, comprising:
    a first trusted computing device;
    an unrecognized computing device, wherein the unrecognized computing device is not recognized by the first trusted computing device; and
    a second trusted computing device, communicatively coupled with the first trusted computing device and the unrecognized computing device, comprising:
        a memory operable to store a first list of trusted computing devices comprising:
            a first identification uniquely identifying the first trusted computing device; and
            a second identification uniquely identifying the unrecognized computing device, wherein the first list of trusted computing devices represents computing devices that belong to a trusted network of trusted computing devices;
        a first processor, operably coupled with the memory, and configured to:
            receive, from the first trusted computing device, a first query message requesting whether the unrecognized computing device is noted in the first list of trusted computing devices, in response to the first trusted computing device receiving a first request from the unrecognized computing device to establish a first communication with the first trusted computing device, wherein the first query message comprises the second identification;

determine whether the unrecognized computing device is noted in the first list of trusted computing devices by determining whether the second identification is in the first list of trusted computing devices; and in response to determining that the unrecognized computing device is noted in the first list of trusted computing devices, send a first response message to the first trusted computing device indicating that the unrecognized computing device is noted in the first list of trusted computing devices;

wherein the memory is operable to store a list of untrusted computing devices; and wherein the first processor is further configured to:
  determine whether the unrecognized computing device is noted in the list of untrusted computing devices by determining whether the second identification is in the list of untrusted computing devices;
  in response to determining that the unrecognized computing device is noted in the list of untrusted computing devices, send a second response message to the first trusted computing device indicating that the unrecognized computing device is noted in the list of untrusted computing devices and the first trusted computing device should deny the first request from the unrecognized computing device to establish the first communication; and
  determine a number of communication attempts made by the unrecognized computing device in a preset amount of time, and if that number is greater than a threshold add the unrecognized computing device to the list of untrusted computing devices.

2. The system of claim 1, wherein the first trusted computing device comprises a second processor configured to, in response to receiving the first response message, approve the first request.

3. The system of claim 2, wherein the second processor of the first trusted computing device is further configured to, in response to receiving the first response message, add the second identification to a second list of trusted computing devices associated with the first trusted computing device.

4. The system of claim 2, further comprising a second unrecognized computing device;
wherein the first processor of the second trusted computing device is further configured to:
  receive, from the first trusted computing device, a second query message requesting whether the second unrecognized computing device is noted in the first list of trusted computing devices, in response to the first trusted computing device receiving a second request from the second unrecognized computing device to establish a second communication with the first trusted computing device, wherein the second query message comprises a third identification uniquely identifying the second unrecognized computing device;
  determine whether the second unrecognized computing device is noted in the first list of trusted computing devices by determining whether the third identification is in the first list of trusted computing devices; and
  in response to determining that the second unrecognized computing device is not noted in the first list of trusted computing devices, send a second response message to the first trusted computing device indicating that the second unrecognized computing device is not noted in the first list of trusted computing devices.

5. The system of claim 4, wherein the second processor of the first trusted computing device is further configured to, in response to receiving the second response message, deny the second request.

6. The system of claim 4, wherein each of the unrecognized computing device, the first trusted computing device, the second trusted computing device, and the second unrecognized computing device comprises a mobile phone, a laptop computer, a desktop computer, a tablet computer, a smartwatch, or an automated teller machine.

7. The system of claim 4, wherein each of the first identification, the second identification, and the third identification comprises an Internet Protocol (IP) address, a Media Access Control (MAC) address, or a serial number associated with the first trusted computing device, the unrecognized computing device, and the second unrecognized computing device, respectively.

8. The system of claim 1, wherein the first processor of the second trusted computing device is further configured to determine that the first trusted computing device is trusted based at least in part upon verifying that the first trusted computing device is connected to a same communication network account as the second trusted computing device.

9. A method for identifying a trusted machine for Machine-to-Machine (M2M) validation, comprising:
  receiving, from a first trusted computing device, by a second trusted computing device, a first query message requesting whether an unrecognized computing device is noted in a first list of trusted computing devices associated with the second trusted computing device, in response to the first trusted computing device receiving a first request from the unrecognized computing device to establish a first communication with the first trusted computing device, wherein:
    the first query message comprises a second identification,
    the unrecognized computing device is not recognized by the first trusted computing device,
    the first trusted computing device is uniquely identified by a first identification,
    the unrecognized computing device is uniquely identified by the second identification, and
    the first list of trusted computing devices represents computing devices that belong to a trusted network of trusted computing devices;
  determining, by the first trusted computing device, a number of communication attempts made by the unrecognized computing device in a preset amount of time, and if that number is greater than a threshold, add the unrecognized computing device to a list of untrusted computing devices;
  determining, by the second trusted computing device, whether the unrecognized computing device is noted in the first list of trusted computing devices by determining whether the second identification is in the first list of trusted computing devices;

in response to determining that the unrecognized computing device is noted in the first list of trusted computing devices, sending, by the second trusted computing device, a first response message to the first trusted computing device indicating that the unrecognized computing device is noted in the first list of trusted computing devices;

in response to determining that the unrecognized computing device is not noted in the first list of trusted computing devices, determining, by the second trusted computing device, whether the unrecognized computing device is noted in the list of untrusted computing devices by determining whether the second identification is in the list of untrusted computing devices; and in response to determining that the unrecognized computing device is noted in the list of untrusted computing devices, sending, by the second trusted computing device, a second response message to the first trusted computing device indicating that the unrecognized computing device is noted in the list of untrusted computing devices and the first trusted computing device should deny the first request from the unrecognized computing device to establish the first communication.

10. The method of claim 9, further comprising, in response to receiving the first response message, approving, by the first trusted computing device, the first request.

11. The method of claim 10, further comprising, in response to receiving the first response message, adding, by the first trusted computing device, the second identification to a second list of trusted computing devices associated with the first trusted computing device.

12. The method of claim 10, further comprising:
receiving, from the first trusted computing device, by the second trusted computing device, a second query message requesting whether a second unrecognized computing device is noted in the first list of trusted computing devices, in response to the first trusted computing device receiving a second request from the second unrecognized computing device to establish a second communication with the first trusted computing device, wherein the second query message comprises a third identification uniquely identifying the second unrecognized computing device;

determining, by the second trusted computing device, whether the second unrecognized computing device is noted in the first list of trusted computing devices by determining whether the third identification is in the first list of trusted computing devices; and in response to determining that the second unrecognized computing device is not noted in the first list of trusted computing devices, sending, by the second trusted computing device, a second response message to the first trusted computing device indicating that the second unrecognized computing device is not noted in the first list of trusted computing devices.

13. The method of claim 12, further comprising, in response to receiving the second response message, denying, by the first trusted computing device, the second request.

14. The method of claim 12, wherein each of the unrecognized computing device, the first trusted computing device, the second trusted computing device, and the second unrecognized computing device comprises a mobile phone, a laptop computer, a desktop computer, a tablet computer, a smartwatch, or an automated teller machine.

15. The system of claim 4, wherein each of the first identification, the second identification, and the third identification comprises an Internet Protocol (IP) address, a Media Access Control (MAC) address, or a serial number associated with the first trusted computing device, the unrecognized computing device, and the second unrecognized computing device, respectively.

16. A device for identifying a trusted machine for Machine-to-Machine (M2M) validation, communicatively coupled with a first trusted computing device and an unrecognized computing device, comprising:
a memory operable to store a first list of trusted computing devices comprising:
a first identification uniquely identifying the first trusted computing device; and
a second identification uniquely identifying the unrecognized computing device, wherein:
the first list of trusted computing devices represents computing devices that belong to a trusted network of trusted computing devices, and
the unrecognized computing device is not recognized by the first trusted computing device; and
a first processor, operably coupled with the memory, and configured to:
receive, from the first trusted computing device, a first query message requesting whether the unrecognized computing device is noted in the first list of trusted computing devices, in response to the first trusted computing device receiving a first request from the unrecognized computing device to establish a first communication with the first trusted computing device, wherein the first query message comprises the second identification;
determine whether the unrecognized computing device is noted in the first list of trusted computing devices by determining whether the second identification is in the first list of trusted computing devices; and
in response to determining that the unrecognized computing device is noted in the first list of trusted computing devices, send a first response message to the first trusted computing device indicating that the unrecognized computing device is noted in the first list of trusted computing devices;
wherein the memory is operable to store a list of untrusted computing devices; and
wherein the first processor is further configured to:
determine whether the unrecognized computing device is noted in the list of untrusted computing devices by determining whether the second identification is in the list of untrusted computing devices;
in response to determining that the unrecognized computing device is noted in the list of untrusted computing devices, send a second response message to the first trusted computing device indicating that the unrecognized computing device is noted in the list of untrusted computing devices and the first trusted computing device should deny the first request from the unrecognized computing device to establish the first communication; and
determine a number of communication attempts made by the unrecognized computing device in a preset amount of time, and if that number is greater than a threshold, add the unrecognized computing device to the list of untrusted computing devices.

17. The device of claim 16, wherein the first trusted computing device comprises a second processor configured to, in response to receiving the first response message, approve the first request.

18. The device of claim 17, wherein the second processor of the first trusted computing device is further configured to, in response to receiving the first response message, add the second identification to a second list of trusted computing devices associated with the first trusted computing device.

19. The device of claim 17, wherein the first processor of the device is further configured to:

receive, from the first trusted computing device, a second query message requesting whether a second unrecognized computing device is noted in the first list of trusted computing devices, in response to the first trusted computing device receiving a second request from the second unrecognized computing device to establish a second communication with the first trusted computing device, wherein the second query message comprises a third identification uniquely identifying the second unrecognized computing device;

determine whether the second unrecognized computing device is noted in the first list of trusted computing devices by determining whether the third identification is in the first list of trusted computing devices; and in response to determining that the second unrecognized computing device is not noted in the first list of trusted computing devices, send a second response message to the first trusted computing device indicating that the second unrecognized computing device is not noted in the first list of trusted computing devices.

20. The device of claim 19, wherein the second processor of the first trusted computing device is further configured to, in response to receiving the second response message, deny the second request.

* * * * *